United States Patent
Tarbotton et al.

(10) Patent No.: US 7,340,775 B1
(45) Date of Patent: Mar. 4, 2008

(54) SYSTEM, METHOD AND COMPUTER PROGRAM PRODUCT FOR PRECLUDING WRITES TO CRITICAL FILES

(75) Inventors: Lee Codel Lawson Tarbotton, Aylesbury (GB); Daniel J. Wolff, Aylesbury (GB); Neil A. Cowie, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1365 days.

(21) Appl. No.: 10/028,651

(22) Filed: Dec. 20, 2001

(51) Int. Cl.
 *G06F 12/14* (2006.01)
 *G08B 23/00* (2006.01)

(52) U.S. Cl. ........................ 726/24; 713/188
(58) Field of Classification Search ................ 713/200, 713/188; 726/24
See application file for complete search history.

(56) References Cited

U.S. PATENT DOCUMENTS

| | | | | |
|---|---|---|---|---|
| 6,073,239 | A |  | 6/2000 | Dotan ........................ 713/200 |
| 6,397,335 | B1 | * | 5/2002 | Franczek et al. ........... 713/200 |
| 6,618,735 | B1 | * | 9/2003 | Krishnaswami et al. .... 707/203 |
| 6,850,943 | B2 | * | 2/2005 | Teixeira et al. .............. 707/10 |
| 2002/0133702 | A1 | * | 9/2002 | Stevens ....................... 713/163 |
| 2002/0166059 | A1 | * | 11/2002 | Rickey et al. ............... 713/200 |
| 2003/0140251 | A1 | * | 7/2003 | Marin et al. ................ 713/201 |

FOREIGN PATENT DOCUMENTS

| | | |
|---|---|---|
| JP | 09319644 | 12/1997 |
| WO | 93/25024 | 12/1993 |

OTHER PUBLICATIONS

"Q222193—Description of the Windows 2000 Windows File Protection Feature," Microsoft, Jul. 8, 1999, pp. 1-5.*
Ferris, Jeffrey A., Windows 2000 Deployment & Desktop Management, Apr. 21, 2000, pp. 1-2.*
"Windows File Protection in Windows 2000," Sep. 17, 2000, pp. 1-2. <http://web.ukonline.co.uk/cook/wfp.htm>.*

\* cited by examiner

*Primary Examiner*—Emmanuel Moise
*Assistant Examiner*—Michael Pyzocha
(74) *Attorney, Agent, or Firm*—Zilka-Kotab, PC; Christopher J. Hamaty

(57) ABSTRACT

A system, method and computer program product are provided for preventing writes to critical files. Initially, factors associated with a computer are identified. Then, requests to write to files on the computer are monitored. The writes to the files on the computer are conditionally prevented based on the factors to prevent virus proliferation. In use, the factors are altered based on the monitoring of the requests.

15 Claims, 5 Drawing Sheets

SYSTEM, METHOD AND COMPUTER PROGRAM PRODUCT FOR PRECLUDING WRITES TO CRITICAL FILES

FIELD OF THE INVENTION

The present invention relates to network security management, and more particularly to preventing critical files from being overwritten or altered by a virus or other malicious code.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capacities in order to cause denial of service, and so forth. Network security risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

One common technique for preventing a security event is to preclude the fulfillment of write requests to sensitive files (i.e. executable files, etc.). U.S. Pat. No. 6,073,239 to Dotan teaches such a system. In particular, a method is disclosed for protecting executable computer programs against infection by a computer virus program. The method prevents writing operations that attempt to modify portions of the program, such as the program's entry point or first instructions. A writing operation that attempts to write data to the program is intercepted and analyzed before the operation is allowed to be processed. The method selects significant data and stores the data, in order to retain information indicative of the program prior to any modification thereof. The method then determines if the writing operation is attempting to modify the significant data, and if it is determined that the writing operation is attempting to modify the data, an alarm is generated and operation is denied. If it is determined that the writing operation is not attempting to modify the data, the writing operation as allowed to continue. Additionally, the program can be restored to its initial state using the stored information and data. The method further uses the stored data indicative of the significant data of the program to restore the program to its initial state and undo all the modifications that the virus may have made to the program.

Unfortunately, such systems have significant limitations in that they are not dynamic, they can not be tailored to a particular system, they do not take into account the application that makes the write request, and they do not consider the location of the file to be written. There is thus a need for a technique of overcoming these and various other related disadvantages and shortcomings associated with the prior art.

DISCLOSURE OF THE INVENTION

A system, method and computer program product are provided for preventing writes to critical files. Initially, factors associated with a computer are identified. Then, requests to write to files on the computer are monitored. The writes to the files on the computer are conditionally prevented based on the factors to prevent virus proliferation. In use, the factors are altered based on the monitoring of the requests.

In one embodiment, the factors are selected from the group consisting of critical files, critical file locations, and trusted applications. Such factors may be user configurable. Further, the factors may be identified in a registry.

In another embodiment, the factors may include critical files associated with an operating system of the computer. In addition, the factors may include critical file locations associated with an operating system of the computer. Such critical file locations may include folders. Still yet, the factors may include trusted applications that initiate the requests.

In still another embodiment, the factors may be updated based on a user request. Further, the factors may be updated from a remote location via a network. Also, the factors may be updated based at least in part on the manner and nature of the write requests. By these updates, the present embodiment may "learn" about the system, and better prevent writes to critical files.

In use, writes to the files on the computer may also be conditionally prevented based on a user confirmation. Still yet, the factors may be updated based on the user confirmation.

DESCRIPTION OF THE PREFERRED EMBODIMENTS

Figure 1:
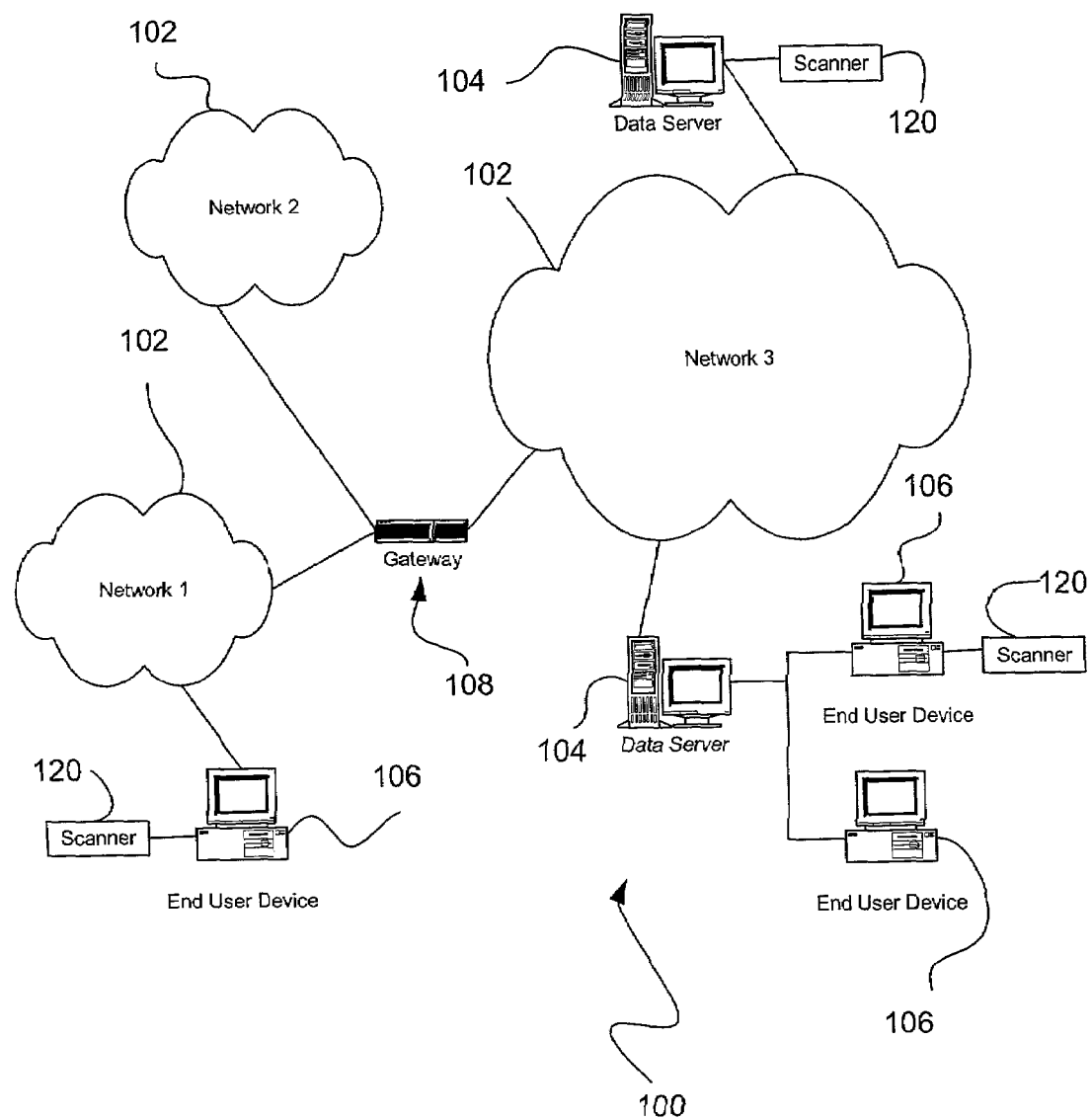
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments.

While shown attached to the gateway 108, any of the foregoing components and/or segments may be equipped with a scanner 120 including anti-virus scanning software. Such scanner 120 may be equipped to probe for network weaknesses by simulating certain types of security events that make up an attack. Such scanner 120 may also test user passwords for suitability and security. Moreover, the scanner 120 may also search for known types of security events in the form of malicious programs such as viruses, worms, and Trojan horses. Still yet, the scanner 120 may be adapted for content filtering to enforce an organization's operational policies [i.e. detecting harassing or pornographic content, junk e-mails, misinformation (virus hoaxes), etc.]. Of course, the scanner 120 may take any other sort of security measures.

Instead of or in addition to the foregoing capabilities, the scanner 120 may operate to prevent critical files from being written. Initially, factors associated with a computer are identified. Then, requests to write to files on the computer are monitored. The writes to the files on the computer are conditionally prevented based on the factors to prevent virus proliferation. In use, such factors are altered based on the monitoring of the requests.

By this design, writes to critical files are prevented based on certain factors. Moreover, such factors are updated during and based on use of the system. More information regarding an exemplary application of such technique will be set forth hereinafter in greater detail.

Figure 2:
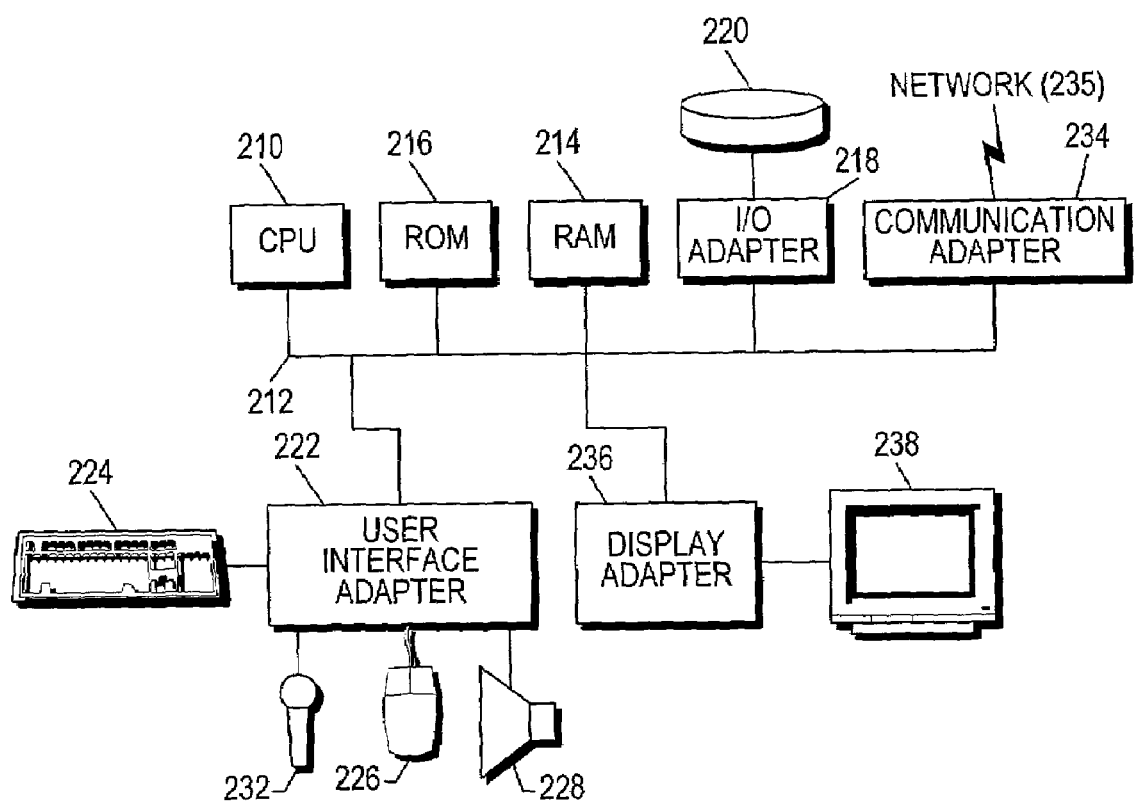
FIG. 2 shows a representative hardware environment that may be associated with the data servers and computers of FIG. 1, in accordance with one embodiment.

FIG. 2 shows a representative hardware environment that may be associated with the data servers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
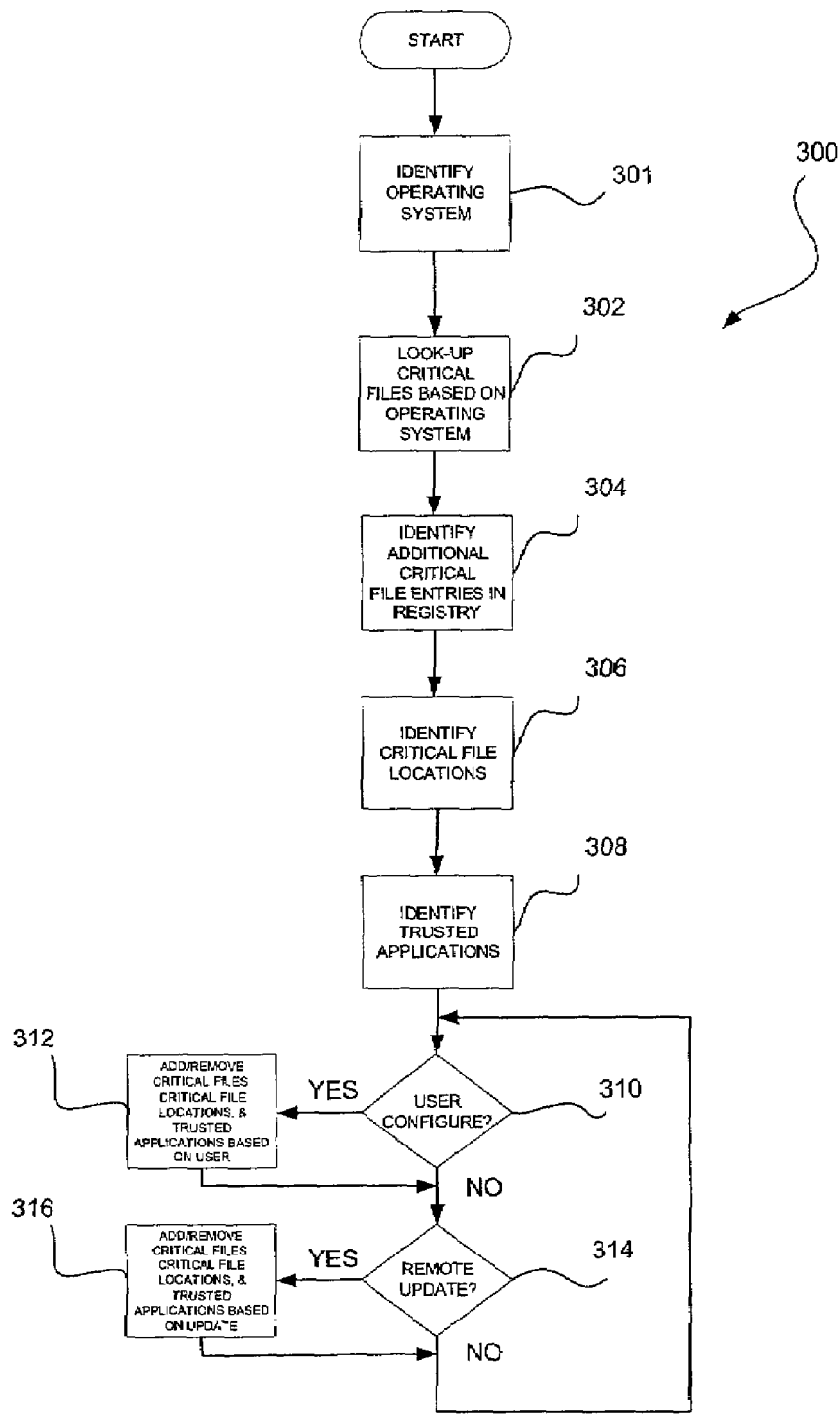
FIG. 3 illustrates a method for generating a plurality of factors on which critical file write-protection may be based.

FIG. 3 illustrates a method 300 for generating a plurality of factors on which critical file write-protection may be based. In one embodiment, the present method 300 may be used in the context of a scanner like that mentioned hereinabove during reference to FIG. 1. Of course, the present techniques may be utilized in any desired context.

Initially, an operating system associated with a system to be monitored is identified. Note operation 301. It should be noted that each operating system may be identified as a particular brand, type, version, etc. In addition to the particular operating system, certain applications may also be identified along with any other particular feature or aspect of the system.

Once identified, various critical files are looked up based on the identified operating system and any other of the foregoing characteristics. See operation 302. In one embodiment, this may be accomplished by maintaining a local or remote default list of critical files for each known operating system, application, etc. As will soon become apparent, such default list of critical files may be updated during use of the system as the scanner "learns" about the use thereof.

In addition to using the default list, critical file entries may also be identified from a registry in operation 304. A registry typically includes information such as what hardware is attached to the system, what system options have been selected, how computer memory is set up, and what application programs are to be present when the operating system is started.

It should be noted that certain files may be deemed critical files based on an extension thereof. For example, executable files with a *.EXE extension may be considered critical by default. In a similar manner, files with a *.DLL may also be deemed critical.

In addition to critical files, critical file locations may be identified in operation 306. Such critical file locations may each include a particular directory, folder or other portion of memory where critical files are stored. For example, an operating system directory or folder may be considered a critical file location, while a temporary file location would not. Such critical file locations may be identified in a manner similar or different from that associated with the critical file identification process.

Still another factor to be identified includes trusted applications that will be accessing the various files and file locations. See operation 308. Similar to the critical file locations, the trusted applications may be identified in a manner similar or different from that associated with the critical file identification process. In the context of the present description, the applications may be identified based on a type, version, location, etc. thereof. For example, any local application not located remote from a system may be considered trusted.

It should be noted that the various factors may be selected and updated in any desired manner. For example, if it is determined that a user wishes to manually contribute to the configuration process in decision 310, any one of the foregoing factors may be added, removed, or otherwise altered per the desires of the user. See operation 312. This may be accomplished utilizing any desired interface. Further, if it is determined an administrator or other remote agent wishes to manually or automatically contribute to the configuration process in decision 314, any one of the foregoing factors may be added, removed, or otherwise altered remotely via a network. See operation 316.

It should be noted that the foregoing factors may influence a decision to preclude the fulfillment of a write request in order to prevent the proliferation of a virus or any damaging consequences associated therewith.

Figure 4:
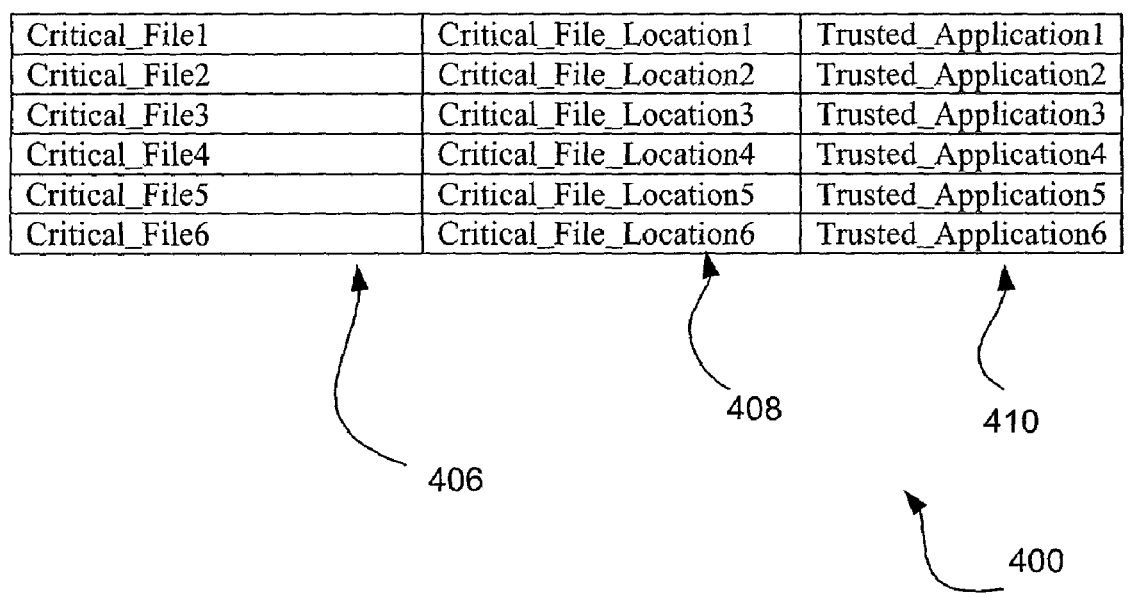
FIG. 4 illustrates an exemplary data structure that results from the method of FIG. 3.

FIG. 4 illustrates an exemplary data structure 400 that results from the method 300 of FIG. 3. Of course, the various factors may be organized, stored, etc. in any desired manner. As shown in FIG. 4, the data structure 400 includes a plurality of critical files 406, a plurality of critical file locations 408, and trusted applications 410.

Figure 5:
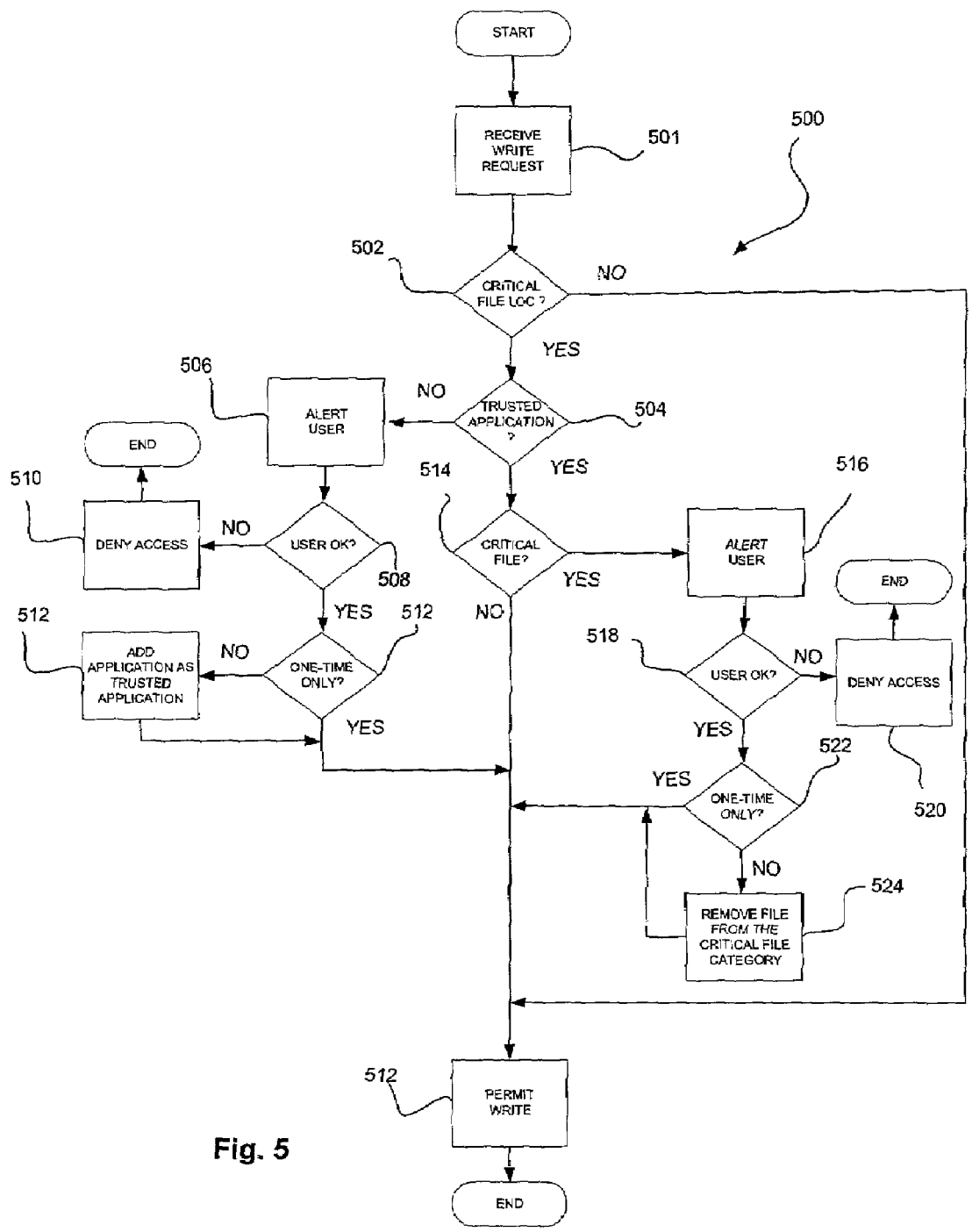
FIG. 5 is a flowchart showing a method for conditionally preventing writes to files, in accordance with one embodiment.

FIG. 5 is a flowchart showing a method 500 for conditionally preventing writes to files, in accordance with one embodiment. Provided with a list of factors such as those set forth during reference to FIG. 4, the present method 500 is capable of conditionally preventing writes to files based on the factors. Further, the present method 500 is adapted for updating the factors during the course of use of the system, in a manner that will soon become apparent.

The present method 500 is initiated upon the receipt of a write request in operation 501. Such write request may be initiated in any desired manner. For example, the write request may be received from a user, an application, from a remote computer, etc. Further, the write request may identify a file to be written.

It is then determined in decision 502 whether the location of the file to be written is in a critical file location. This may be accomplished by simply comparing the file location with a data structure like that shown in FIG. 4. If not, the write may be permitted in operation 512. As an option, additional security features may be initiated before permitting such write.

If, however, it is determined in decision 502 that the location of the file to be written is in a critical file location, it is then determined whether the application initiating such write request is trusted. See decision 504. Again, this may be accomplished by simply comparing the application with a data structure like that shown in FIG. 4. If the application is not trusted, the user is alerted in operation 506. This may be accomplished in any desired manner. For example, a visual notification may be displayed on the computer or at any remote location.

Next, it is determined in decision 508 whether a user will permit the write request from the untrusted application. This may be accomplished by simply prompting the user to OK the write utilizing a pop-up window or the like. If the user does not OK the write, the write and any access to the file may be denied in operation 510, after which the method 500 is terminated until another write request is received.

If, however, the user does OK the write, it is then determined whether the user is permitting the fulfillment of the present write request from the untrusted application, or all future write requests from the untrusted application. See decision 512. Again, this may be accomplished by simply prompting the user to decide using a pop-up window or the like. If the user wishes to permit all future write requests from the untrusted application in decision 512, the application may be added as a trusted application in a data structure such as that of FIG. 4. In any case, the write is permitted in operation 512.

Returning again to decision 504, if it is determined that the application initiating such write request is trusted, it is then determined whether the file is critical. See decision 514. Similar to before, this may be accomplished by simply comparing the application with a data structure like that shown in FIG. 4. If the file is critical, the user is alerted to this fact in operation 516. This may be accomplished in any desired manner. For example, a visual notification may be displayed on the computer or at any remote location.

Next, it is determined in decision 518 whether a user will permit the write to the critical file. This may be accomplished by simply prompting the user to OK the write utilizing a pop-up window or the like. If the user does not OK the write, the write and any access to the file may be denied in operation 520, after which the method 500 is terminated until another write request is received.

If, however, the user does OK the write, it is then determined whether the user is permitting the fulfillment of the present write request to the critical file, or all future write requests to the critical file. See decision 522. Again, this may be accomplished by simply prompting the user to decide using a pop-up window or the like. If the user wishes to permit all future writes to the critical file in decision 522, the crucial file may be removed as a critical file in a data structure such as that of FIG. 4. In any case, the write is permitted in operation 512. While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for preventing writes to critical files, comprising:
   identifying factors associated with a computer;
   monitoring requests to write to files on the computer; and
   conditionally preventing the writes to the files on the computer based on the factors to prevent virus proliferation;
   wherein the factors are altered based on the monitoring of the requests to write to the files on the computer;
   wherein the factors are updated based on the requests;
   wherein if one of the requests is initiated by an application that is not one of a plurality of trusted applications, a user is alerted and allowed to at least one of prevent and permit the request initiated by the application.

2. The method as recited in claim 1, wherein the factors are selected from the group consisting of critical files, critical file locations, and the plurality of trusted applications.

3. The method as recited in claim 2, wherein the factors include critical files associated with an operating system of the computer.

4. The method as recited in claim 2, wherein the factors include critical file locations associated with an operating system of the computer.

5. The method as recited in claim 4, wherein the critical file locations include folders.

6. The method as recited in claim 2, wherein the factors include the plurality of trusted applications that initiate the requests.

7. The method as recited in claim 1, wherein the factors are user configurable.

8. The method as recited in claim 1, wherein the factors are identified in a registry.

9. The method as recited in claim 1, wherein the factors are updated based on a user request.

10. The method as recited in claim 1, wherein the factors are updated from a remote location via a network.

11. The method as recited in claim 1, and further comprising conditionally preventing the writes to the files on the computer based on a user confirmation.

12. The method as recited in claim 11, wherein the factors are updated based on the user confirmation.

13. The method as recited in claim 1, wherein the factors include a list of critical files such that the list of critical files is updated based on the requests.

14. A method for preventing writes to critical files, comprising:

identifying an operating system associated with a computer;

looking up at least one of critical files and critical file locations associated with the operating system; and preventing access to the at least one of critical files and critical file locations associated with the operating system to prevent virus proliferation;

wherein the at least one of critical files and critical file locations are looked up based on requests to write to the at least one of critical files and critical file locations on the computer;

wherein if one of the requests is initiated by an application that is not one of a plurality of trusted applications, a user is alerted and allowed to at least one of prevent and permit the request initiated by the application.

15. A method, comprising:

identifying factors associated with a computer;

monitoring requests to write to files on the computer; and conditionally preventing the writes to the files on the computer based on the factors to prevent virus proliferation;

wherein the factors are altered based on the monitoring of the requests to write to the files on the computer;

wherein the factors are updated based on the requests;

wherein the factors include trusted applications that initiate the requests;

wherein if one of the requests is initiated by an application that is not one of the trusted applications, a user is alerted and allowed to at least one of prevent and permit the request initiated by the application.

* * * * *

UNITED STATES PATENT AND TRADEMARK OFFICE
CERTIFICATE OF CORRECTION

| | | |
|---|---|---|
| PATENT NO. | : 7,340,775 B1 | Page 1 of 1 |
| APPLICATION NO. | : 10/028651 | |
| DATED | : March 4, 2008 | |
| INVENTOR(S) | : Tarbotton et al. | |

It is certified that error appears in the above-identified patent and that said Letters Patent is hereby corrected as shown below:

col. 8, line 12 replace "computer," with --computer;--.

Signed and Sealed this

Second Day of February, 2010

David J. Kappos
*Director of the United States Patent and Trademark Office*